United States Patent Office 3,356,922
Patented Dec. 5, 1967

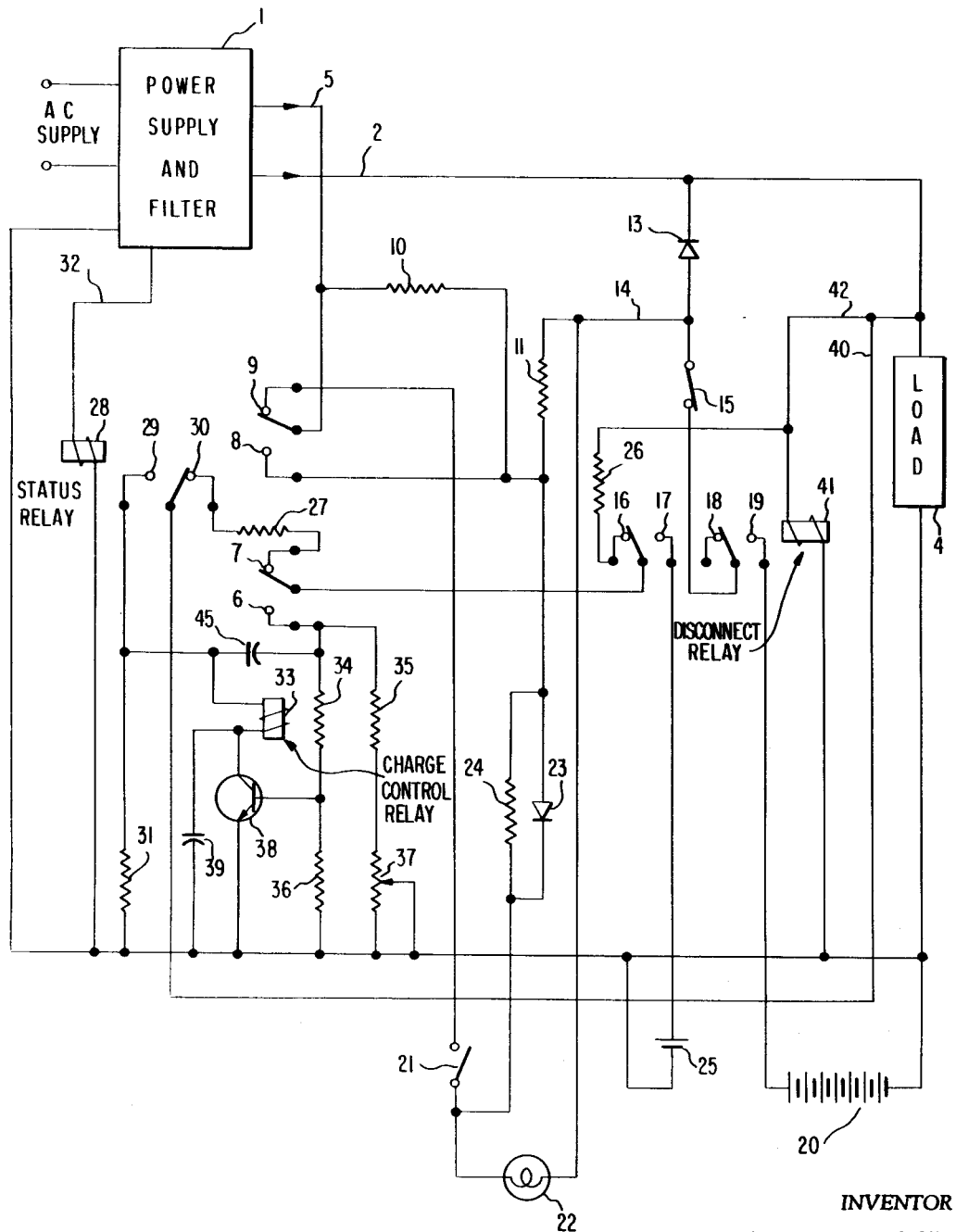

3,356,922
AUTOMATIC BATTERY CHARGING CIRCUIT
Samuel A. Johnston, Fontana, Wis., assignor to Amphenol Corporation, Broadview, Ill., a corporation of Delaware
Filed Apr. 8, 1965, Ser. No. 446,520
18 Claims. (Cl. 320—6)

ABSTRACT OF THE DISCLOSURE

Method and circuit for controlling the recharging of a battery power supply as a function of the charge on a timing battery, the timing battery being charged by a percentage of the discharge current of the battery power supply.

This invention relates to automatic battery charging wherein a battery is automatically recharged by an amount equal to the charge that has been consumed from the battery during the previous discharge cycle. Automatic battery chargers are useful to restore discharged batteries in systems powered by batteries and also in mains operating systems requiring rechargeable standby battery operation, should the primary power source fail. Thus, this invention may be utilized in connection with electronic test equipment as well as with other battery operated consumer items such as portable radio and television sets, electric drills, and the like.

Automatic battery chargers have heretofore used bulky, complex mechanical and electronic timing devices to obtain recharge of the battery by a predetermined normal amount after each discharge cycle. If the battery were used to deliver power in less than the predetermined normal amount, serious overcharging could result during the next recharging cycle. This problem of overcharging has become increasingly critical with the advent of sealed nickel cadmium batteries, as the oxygen sealed in the cells can build up sufficient pressure during excessive rapid charging to explode. Also the rechargeable batteries are subject to being undercharged by the conventional timing devices if the previous discharge cycle is abnormally extended past the predetermined normal amount. This results in a reduction in the available running time of the battery and seriously limits the practical use of the system.

These problems and disadvantages have largely been eliminated by the present conception and contribution to the art. Use of the instant invention will enable a rechargeable battery to be accurately recharged to the desired level with no possibility of over-charging. Also, by proper adjustment of the present invention, under-charging of a battery and subsequent unreliability of a dependent system may be overcome. These novel features and advantages are accomplished by the present system which may occupy a very small space, is fully automatic and requires only a simple circuit composed of conventional electronic elements. Also with the present system, ordinary rechargeable batteries may be utilized, thus providing a distinct advantage over those recharging systems requiring expensive or special battery cells.

It is, accordingly, one of the objects of this invention to provide a method and apparatus for automatically recharging a battery only to the extent that it was consumed during the previous discharge cycle.

It is another object of the invention to provide a method and apparatus to prevent the explosion of sealed batteries due to overcharging, but which will allow the batteries to become fully charged.

It is a further object of this invention to provide an apparatus and method of recharging a battery whereby the charging interval may range from a few seconds to many hours, depending on the amount of charge required by the battery.

Another object of this invention is to provide an ampere hour type battery charger which does not use conventional moving parts or complex circuitry for the timing circuit, and which is thus simpler and more reliable than conventional timers.

A further object of the invention is to provide a method and apparatus for an automatic battery charger which may be easily varied to satisfy power and economy requirements for different applications.

Another object of the invention is to provide an automatic standby battery system which is available to provide constant power to a system even though a main power failure occurs.

In accordance with one aspect of the invention, a main battery is provided to supply power to a system during a main power supply failure. In order to measure the amount of current discharged from the main battery, an auxiliary timing battery is charged with a small predetermined fraction of the battery discharge current. The auxiliary battery may consist of a single cell. Obviously, the main battery will supply a higher voltage than the timing battery in order to charge the latter. When the main power supply becomes operative and the main battery charging is initiated, the timing battery has been charged by an amount related to the magnitude and the duration of the current discharged from the battery. This charge on the timing battery is then subjected to a controlled discharge which establishes the timing period for charging the main battery. The main battery charging period is terminated when the timing battery reaches a predetermined level of discharge. The timing battery voltage is used to provide forward bias to a transistor, which in turn holds a relay in an energized position to provide charging current to the main battery. When the timing battery discharges to a predetermined potential that is too low to supply an adequate biasing voltage to the transistor, the controlled circuitry interrupts the charge current to the main battery and stops the discharge from the timing battery. At this time the main battery is charged to its desired extent, and the timing battery is ready to again measure the amount of the next main battery discharge.

Other aspects of the invention relating to specific circuit details will become more apparent upon reference to the specification in connection with the accompanying drawing, wherein:

The figure shows a detailed schematic diagram of a standby battery system utilizing a preferred embodiment of the present invention.

Referring specifically to the drawings, during normal operation with main battery 20 fully charged and timing battery 25 discharged, power supply 1 filters the incoming alternating current power into a direct current output circuit including line 2 which is applied to load 4. During a failure of the AC supply, it offers high impedance for battery potential that may be applied to lead 2. As previously indicated, load 4 may represent electronic test equipment, commercial consumer products, or the like. Also, during this phase of operation, status relay 28 is energized by power supply output 32 to indicate power supply operation, and contact 29 is held closed; charge control relay 33 is de-energized, with contacts 7 and 9 closed; and disconnect relay 41 is energized by a portion of the direct current supply, holding contacts 17 and 19 closed.

Assume that the alternating power is interrupted for an interval of time from a few seconds to full running time of the main battery 20, which typically might be eight hours. Main battery 20 immediately begins to discharge through contact 19 and diode 13 to load 4, providing normal power to the load. Under this condition, status relay 28 is de-energized by the absence of output 32, closing contact 30; charge control relay 33 remains de-energized; and disconnect relay 41 remains energized by a portion of the direct current flow from main battery 20.

A small value of current, which could be of the magnitude of 8 ma., flows from main battery 20 through conductor 40, status relay contact 30, resistor 27, charge control relay contact 7, and disconnect relay contact 17 to charge timing battery 25. Thus, while main battery 20 is discharging, timing battery 25 is measuring and integrating a fraction of the main battery discharge. In order not to overcharge timing battery 25, the ampere hour capacity of the cell and the measuring current value limited by resistor 27 will be determined so that timing battery 25 never becomes fully charged even though the full running time of battery 20 elapses. A typical cell size of timing battery 25 is 100 ma. hour.

Load 4 may be, for example, a test oscillator, a flashlight bulb or other circuitry drawing a relatively constant current with time from main battery 20. The network shown applies a predetermined small fraction of the load current as the charging current for the timing battery 25. This relationship, or current ratio, is produced by the shunt paths placing the series charging circuit for the timing battery across the load potential applied by main battery 20. In the event that a load circuit is employed characterized by varying loads, such as an electric drill, the shunt charge arrangement would obviously not operate equally accurately. Under a varying load such as just mentioned, the charging potential for the timing battery would conveniently be obtained from a series resistor in the main load circuit which would conform the charging potential for the timing battery with variations in the load current drawn from the main battery. Thus the charge developed by the timing battery would be correlated with the charge integral drawn from the main battery under widely varying load conditions.

In the event that the full running time of the main battery 20 is used, battery 20 cuts off its own discharge to prevent deep discharge and possible reverse charge on the first cells to discharge, which are the ones with the lowest ampere hour capacity. Disconnect relay 41 becomes de-energized when battery 20 reaches a predetermined terminal voltage, and contacts 19 and 17 are opened. This leaves main battery 20 discharged to a safe extent and isolates timing battery 25, which remains charged at the measured voltage. Thus, when alternating current is again available, timing battery 25 still retains the charge necessary to effect a full recharge on main battery 20.

When alternating current is restored, status relay 28 is again energized, opening contact 30 to interrupt the charge current being supplied to timing battery 25. Contact 29 is closed to provide collector voltage to transistor 38, and to provide a pulse of timing battery charging current through capacitor 32 and resistors 34 and 36 to forward bias the base of transistor 38. This energizes charge control relay 33 momentarily to close contact 6, which connects the charged timing battery 25 through disconnect relay contact 17 to resistor network 34, 35, 36, and 37. Timing battery 25 then applies a forward bias to transistor 38, which holds the charge control relay 33 energized. This closes contact 8, allowing charging current to be applied to the discharged main battery 20 from power supply output 5 through resistor 11, lead 14, and disconnect relay contact 19. A portion of the charging current is also applied to indicator 22 through resistor 24 in order to give a visual indication of when the main battery is being charged. Output circuit 5 may be selected to supply a higher charging potential than does load circuit 2.

During this interval of main battery charging, timing battery 25 is being discharged by resistor network 34, 35, 36, and 37. Resistor 37 is adjustable so that the time to discharge timing battery 25 may be varied within desired limits. When timing battery 25 discharges to a terminal potential that is too low to apply adequate forward bias to transistor 38, charge control relay 33 will be de-energized, and contacts 8 and 6 will open. Thus, the charge current to main battery 20 is interrupted, the control current from timing battery 25 is stopped, and main battery 20 is charged to the same amount as was consumed during the last discharge cycle.

The value selected for resistor 37 which determines the discharge time of timing battery 25 also determines the time during which charge is applied to main battery 20. A typical ratio of charge to discharge time for battery 20 is 7.5:1, or for one hour of battery operation seven and one-half hours are required to recharge the battery. This ratio can, of course, be adjusted to any desired value depending upon the application and the type of battery employed. A value is also selected for resistor 11 to establish the desired charging current for main battery 20.

In the operation of the system, therefore, when charge is interchanged with the main battery, charge is simultaneously reversely interchanged with the timing battery, since as one is charged, the other is discharged. Both cycles are terminated responsively to production of a predetermined condition of discharge of one of the batteries, discharge of the main battery by sensing its state of discharge by relay 41, and charge of the main battery by sensing the state of discharge of the timing battery by transistor 38 and relay 33. In each case, the respective control circuit responds at a predetermined level to the declining terminal voltage characterizing a discharging battery.

Manual switch 21 provides a means for charging main battery 20 upon initial installation of the system. While nickel cadmium batteries are being shipped, both the main battery and timing battery are fully discharged to inhibit oxide formation on the electrodes which occurs when such cells are stored for a long period of time in a charged state. Switch 21 is then closed for a predetermined period, typically 120 hours, to initially charge main battery 20. The manual rate of charge is determined by resistor 24 and 11 in series. After the predetermined time of initial charge, the switch is opened and the automatic recharge system takes control. Light 22 gives a visual indication during the manual charging of standby battery 20.

Numerous objects and advantages of the invention have been set forth in the foregoing disclosure, together with details of the structure and function of the apparatus, and the novel features thereof are pointed out in the appended claims. The disclosure, however, is illustrative only, and changes in matters of shape, size, and arrangement of parts may be made within the general broad scope of the invention. Also those skilled in the art will realize that the conception on which my disclosure is based may readily be utilized in connection with varied applications and structural combinations.

I claim:

1. In an electrical system for employing rechargeable batteries:
    first circuit means connectible with a main battery,
    second circuit means connectible with a timing battery,
    third circuit means operative on discharge current in the first circuit means to supply therefrom charging current in the second circuit means,
    fourth circuit means operative to supply charging current in the first circuit means and to draw discharge current in the second circuit means,
    and means responsive at a predetermined level of declining voltage on the second circuit means to terminate operation of the fourth circuit means.

2. In a battery charging system,
    charging circuit means connectible with a first battery,
    discharging circuit means operative simultaneously with the charging circuit means connectible with a second battery, and means responsive at a predetermined level of declining voltage on the discharging circuit means to terminate operation of the charging circuit means.

3. In a battery discharging system,
discharging circuit means for supplying discharge current connectible with a first battery,
charging circuit means connectible with a second battery,
means coupling the charging circuit means to the discharging circuit means to receive a predetermined small fraction of the discharge current therefrom as charging current,
and means responsive at a predetermined level of declining voltage in the discharging circuit means to terminate current flow in both circuit means and deactivate the coupling means.

4. In a battery powered system:
a first rechargeable battery,
a load circuit therefor,
a charging circuit therefor,
a second rechargeable battery,
circuit means operative on current flow in one of said circuits to interchange charge with said second battery reversely of the charge interchange effected on the first battery by said one circuit,
and means operative to terminate current flow in said one circuit responsively to attainment of a predetermined condition of discharge by one of said batteries.

5. An electrical system comprising:
a first rechargeable battery,
a second rechargeable battery connectible with first battery to receive charge during discharge of the first battery,
circuit means connected with said first battery for supplying charging current to said first battery,
means operative during operation of the circuit means to discharge the second battery,
and control means responsive to a predetermined discharge level of said second battery to terminate charging operation of the circuit means.

6. An electrical system comprising:
a first rechargeable battery,
a second rechargeable battery,
circuit means connectible with the first and second batteries to discharge the first battery through a load and to supply a predetermined fraction of the load current to the second battery as charging current,
and means responsive to a predetermined discharge level of the first battery to deactivate the circuit means and terminate current flow for both batteries.

7. An automatic mains operated electrical system using a standby battery power source comprising:
a rectifier power supply for energizing the system and for providing a charging current,
a rechargeable main battery,
means discharging the main battery through the system during deactivation of the power supply,
timing battery means reeciving charging current from the main battery during its discharge,
and means operative upon reactivation of the power supply to supply charging current from the power supply to the main battery for a period determined by the state of charge of the timing battery.

8. The system of claim 7 wherein the last named means further includes means for discharging the timing battery.

9. The system of claim 7 further including current control means for proportioning the currents of the main and timing batteries.

10. The system of claim 7 wherein said last named means further comprises switching means for controlling the flow of charging current, and transistor circuit means for holding said switching means open in response to the voltage of said timing battery.

11. The system of claim 7 further comprising means for manually charging said rechargeable main battery upon initial installation of said system.

12. The system of claim 7 and further comprising relay means for disconnecting both said timing battery and said standby battery in the event the full running time of main battery is used, in order to prevent harmful deep discharge of said main battery.

13. The system of claim 7 further including visual indicator means for indicating when said main battery is being charged.

14. The apparatus of claim 7 further comprising means responsive to deactivation of said power supply in the event of a power supply failure for initiating discharge of said main battery and the diversion of a fraction of the discharge to said timing battery.

15. The system of claim 7 wherein the batteries comprise sealed nickel cadmium cells.

16. The method of apportioning charge required to recharge a first battery comprising:
discharging said battery through a load while applying a predetermined fraction of the discharge current to a second battery to develop a correlated charge,
and discharging the correlated charge at a predetermined rate to define a period during which recharging current is applied to the first battery.

17. The method of electrically cycling a first rechargeable battery comprising:
discharging said first battery through a load circuit while simultaneously discharging a fraction of the load current from the first battery into a second rechargeable battery to charge the latter,
recharging the first battery at a first rate and simultaneously discharging the second battery at a correlated rate,
and terminating the charging operation of the first battery responsively to discharge of the second battery to a predetermined level.

18. The method of using a first rechargeable battery to control a process of charging a second rechargeable battery from a source comprising:
charging said second battery from said source while simultaneously discharging said first battery,
and terminating the charging of said second battery responsive to the resultant production of a predetermined charge level in one of said batteries.

References Cited
UNITED STATES PATENTS

| | | | |
|---|---|---|---|
| 3,105,910 | 10/1963 | Chambers | 320—17 X |
| 3,205,422 | 9/1965 | Gold | 320—39 |
| 3,302,091 | 1/1967 | Henderson | 320—48 |
| 3,321,690 | 5/1967 | McCarthy et al. | 320—25 X |

JOHN F. COUCH, *Primary Examiner.*

S. WEINBERG, *Assistant Examiner.*